United States Patent [19]

Hagenlocher

[11] Patent Number: 5,516,065
[45] Date of Patent: May 14, 1996

[54] LANDING AND ANCHORING MECHANISM FOR AN AIRSHIP

[75] Inventor: Klaus Hagenlocher, Friedrichshafen, Germany

[73] Assignee: Luftschiffbau Zeppelin GmbH, Friedrichshafen, Germany

[21] Appl. No.: 255,001

[22] Filed: Jun. 7, 1994

[30] Foreign Application Priority Data

Jun. 8, 1993 [DE] Germany ............... 43 18 985.7

[51] Int. Cl.⁶ ........................................ B64B 1/66
[52] U.S. Cl. ........................................ 244/115
[58] Field of Search .................. 244/25, 26, 30, 244/102 R, 103 R, 104 R, 104 CS, 115, 116

[56] References Cited

U.S. PATENT DOCUMENTS

| | | | |
|---|---|---|---|
| 1,567,703 | 12/1925 | Broyler | 244/115 |
| 1,693,476 | 11/1928 | Corbett | 244/116 |
| 1,699,672 | 1/1929 | Powelson et al. | 244/104 CS |
| 1,802,692 | 4/1931 | Zindel | 244/104 CS |
| 1,957,285 | 5/1934 | Oehmichen | 244/115 |
| 2,050,570 | 8/1936 | Holler | 244/25 |
| 2,182,648 | 12/1939 | Solomon | 244/104 CS |
| 2,386,814 | 10/1945 | Rosendahl et al. | 244/116 |
| 2,406,302 | 8/1946 | Nelson | 244/30 |
| 4,238,095 | 12/1980 | Slater | 244/26 |
| 5,110,070 | 5/1992 | Hagenlocher et al. | |
| 5,285,986 | 2/1994 | Hagenlocher | |

FOREIGN PATENT DOCUMENTS

| | | | |
|---|---|---|---|
| 424364 | 5/1911 | France . | |
| 617573 | 2/1927 | France | 244/115 |
| 133364 | 10/1901 | Germany . | |
| 1218289 | 2/1966 | Germany . | |

Primary Examiner—Galen L. Barefoot
Attorney, Agent, or Firm—W. G. Fasse; W. F. Fasse

[57] ABSTRACT

A landing and anchoring mechanism for an airship takes advantage of the ship's supporting frame that has a row of cross-ribs interconnected by lengthwise beams arranged between neighboring ribs. In order to make it possible to land on any landing field even without conventional and costly apparatus, and to anchor the airship against the effects of wind and weather, a bi-pod landing gear is combined with an anchoring device. The landing gear is articulately connected to the supporting frame on the one hand and to the airship gondola by respective landing gear lateral rocker arms on the other hand. The bi-pod landing gear is arranged in a crosswise plane in front of the aerodynamic center of wind pressure of the airship. At least a portion of the anchoring device is provided on the floor of the airship gondola in the area of the attachment of the landing gear lateral rocker arms to the gondola floor. The anchoring device is provided for connecting the airship with a mooring on the ground, whereby another portion of the anchoring device may be located on the ground.

23 Claims, 11 Drawing Sheets

LANDING AND ANCHORING MECHANISM FOR AN AIRSHIP

FIELD OF THE INVENTION

The invention relates to a landing and anchoring mechanism for an airship with a supporting frame comprising a row of bulkhead or cross-ribs and longitudinal beams arranged therebetween.

BACKGROUND INFORMATION

All known types of airships, including rigid airships, keel or semi-rigid airships or pressurized non-rigid airships, possess one or more landing wheels which are arranged on the gondola and sometimes on the lower tail fin. After landing on these wheels, the airship is held through bow lines by a ground crew until a mobile or stationary mooring mast or pylon is coupled with the airship.

The coupling location between the airship and the mooring mast is either located at the bow of the airship or, for a low mast, under the belly of the airship in front of the center of lift.

Masts for anchoring at the bow of the ship must be able to withstand a high tilting moment. Such masts are highly loaded and very heavy in order to achieve the required stability for a mobile mast. Stationary masts are anchored into the ground and require high anchoring forces.

Masts for anchoring at the forward body section of the airship, the tilting moment is considerably smaller, typically 50%, but instead a rolling moment arises in the airship because the ship is restrained below the aerodynamic center of wind pressure, that is to say when a wind blows laterally against the airship, the airship will roll sideways at a considerable roll angle, that can be than 25°, until it has again turned itself into the wind.

At least for pressurized non-rigid airships, this type of anchoring is critical due to the large forces acting on the envelope skin. Therefore, this type of anchoring is hardly ever practice used in.

Fundamentally, the anchoring of an airship is carried out in such a manner that the airship is held or restrained at a location forward of the aerodynamic center of wind pressure, so that when the wind blows laterally against the airship, the airship turns into the wind like a weather vane. In this manner, the airship offers the least aerodynamic resistance.

It is a disadvantage of such an anchoring that an anchor mast or mooring mast is absolutely necessary for anchoring an airship. This sharply limits the operation of airships, because it can only take off and land at a prepared base. A mooring mast must be available for every off-field landing. For this reason, ferrying trips over long distances are not possible or only possible with a large expenditure and effort for preparations. When unplanned off-field landings are necessary, for example, due to a breakdown of the airship, the result is often a total loss, as is shown by airship history. Moreover, such mooring masts are expensive.

A further disadvantage of anchoring an airship with the aid of a mast is that the mast, or for mobile masts the mast vehicle, represents an impediment or obstacle for the landing airship because the airship cannot exactly maintain the intended landing point due to shifting winds. The airship then drifts into the mast and is usually severely damaged. Examples are known for the last five years in which, of sixteen pressurized non-rigid airships operating around the world, the envelope of two of these ships became "a total loss" in such an accident.

However, the problem of over-shooting the mast is partially circumvented by using movable masts, which are only driven into position once the airship is stationary. The disadvantage of such a method is, however, to be seen in that the airship must be held by a large holding crew (approximately 15 persons are necessary for holding a small airship of approximately 6000 m$^3$) until the mobile mast is driven into place and anchored.

OBJECTS OF THE INVENTION

Therefore, it is the object of the invention to provide a landing and anchoring mechanism for an airship of the above mentioned type, which makes it possible to land on every landing field even without the conventionally typical costly apparatus, and to securely anchor the airship against the effects of wind and weather.

On such landing fields, the apparatus already present for general aviation purposes, such as secured parking spaces and storm tie-downs to which normally aircraft are tethered should also be useable, with a minimal effort and expanse, for anchoring an airship, or to be equipped for adaptation to an airship.

The use of the normally typical, very costly bow masts should remain limited to use on special airship landing fields and for anchoring the airship against heavy weather effects with wind velocities greater than 6 to 7 Beaufort.

SUMMARY OF THE INVENTION

A landing and anchoring mechanism according to the invention is used for an airship having a supporting frame comprising a row of cross-ribs and longitudinal beams arranged therebetween as is described for example in the German Patent Publication DE-PS 4,018,749 and the German Laying-Open Patent Publication DE-OS 4,112,621.1. In the landing and anchoring mechanism according to the invention a bi-pod landing gear is mounted in a crosswise plane forward of the aerodynamic center of wind pressure in such a manner that it is articulately connected respectively to the supporting frame on the one hand and to the gondola of the airship by a respective landing gear lateral rocker arm on the other hand. In the area where the landing gear lateral rocker arms are secured to the gondola floor, an additional anchoring arrangement is provided in the gondola center line, through which the airship is connected to the anchoring or mooring station and to apparatus provided at these stations.

In this context, the wheel base track of the bi-pod landing gear preferably is approximately 0.7 to 1.2 times the maximum airship diameter.

The landing gear of the invention is articulately connected to the junction node points of the cross-ribs and the longitudinal beams either by a respective shock absorber strut or by a respective tension cable taking up the load from a truss frame of the landing gear. The landing gear can be embodied in such a manner that when necessary it can be folded sideways up against the airship about its attachment points. For bracing purposes, each landing gear lateral link can further be releasably connected to the airship gondola by a bracing link. Furthermore, the shock absorber struts and the landing gear lateral rocker arms can be provided with an aerodynamically advantageous profile in the form of a faring in order to reduce the air resistance. At the outer end of each landing gear lateral rocker arm, it is rigidly connected to a bearing body, which carries a wheel fork for holding a landing gear wheel, whereby the wheel fork with the wheel is rotatably arranged in the bearing body. Moreover, the lower end of the respective shock absorber strut is articulately connected to said bearing body.

The above mentioned additional anchoring arrangement comprises a ground based mooring mechanism and an airship based mooring cable which can be let out from and then again retracted into the airship, and of which the lower end can be connected to the ground based holding or mooring mechanism by a suitable device.

A winch is provided for reeling the mooring cable out and in, whereby the winch can be arranged either in the airship itself or on the ground based mooring mechanism, depending on the particular circumstances.

An anchoring head can be set onto the ground based holding mechanism in a freely rotatable manner and is releasably connected to the holding mechanism, for example by a clamping device.

Furthermore, an additional rigid connection for anchoring the airship can be provided between the gondola floor of the airship and the ground based holding mechanism. Such an additional rigid connection may be in the form of a connecting rod respectively articulately connected with the airship and with the anchoring head. This connecting rod is adjustable in its length and can be lowered from the floor of the airship downward to the ground based holding mechanism. The connecting rod is secured to the gondola floor in such a manner that the connecting rod deviates from the vertical by at least 15° when the airship is anchored in order to take up the longitudinal force.

Finally, it is also conceivable to keep the landing gear on the ground in a preassembled state and only connect it to the airship when it is needed for anchoring.

Moreover, a tail wheel is arranged on the airship in the area behind the aerodynamic center of wind pressure on the floor of the airship or, for example, on the lower stabilizer fin.

Therefore, it is an advantage of the invention that the airship can be safely and securely landed and anchored or moored at an anchoring or mooring station with a minimal cost and effort due to ground based apparatus and ground personnel by means of a simple and lightweight landing and anchoring mechanism.

BRIEF DESCRIPTION OF THE DRAWINGS

In the following the invention will now be described, by way of example, in conjunction with the drawings, wherein.

DETAILED DESCRIPTION OF PREFERRED EXAMPLE EMBODIMENTS AND OF THE BEST MODE OF THE INVENTION

Figure 1:
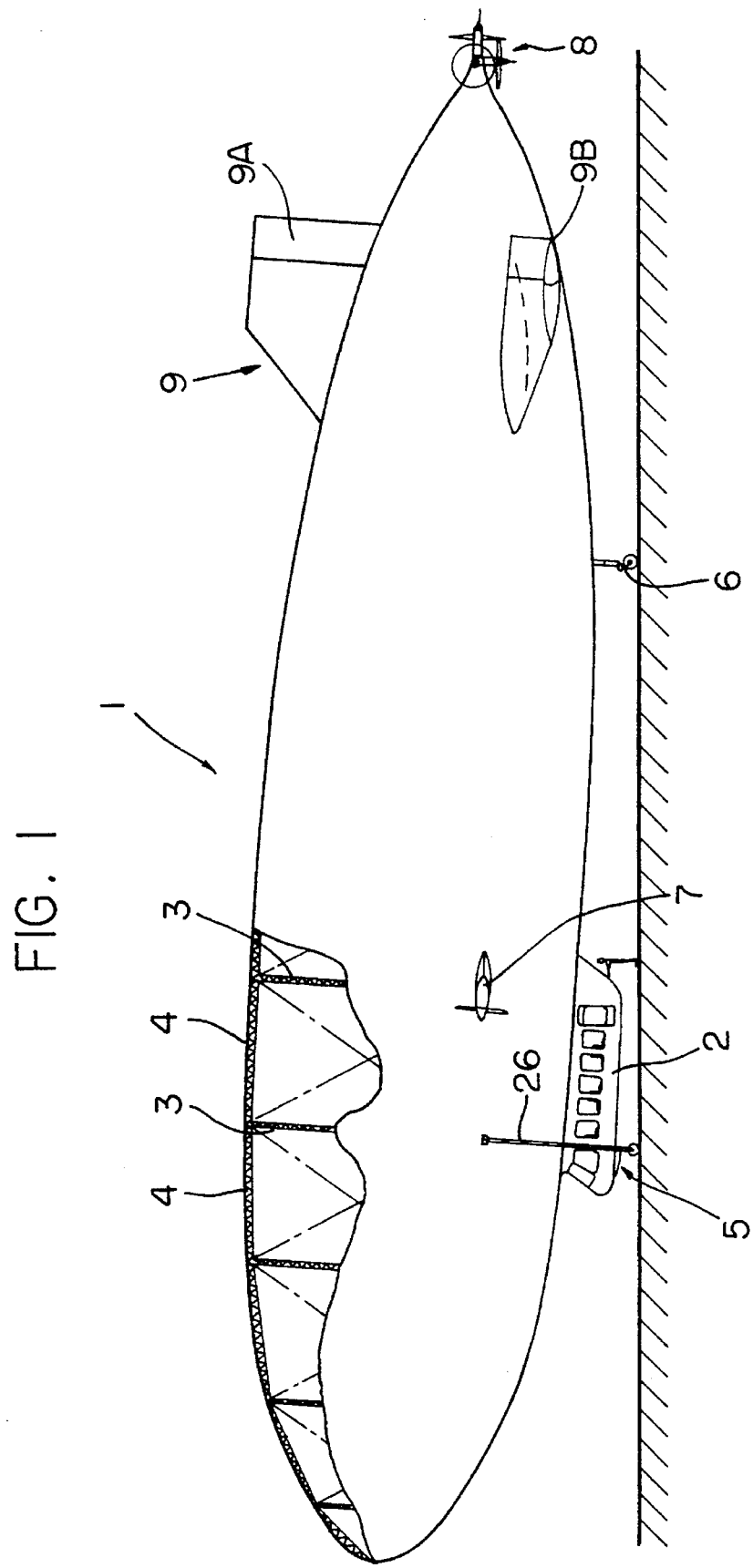
FIG. 1 is a side view of an airship with the landing and anchoring mechanism according to the invention.

FIG. 1 shows, in a side view, a partially sectioned airship 1 with a supporting frame formed of a row of cross-ribs 3 and longitudinal beams 4 set therebetween. An airship gondola 2 is suspended from the floor of the airship 1 for receiving, for example passengers and as a cockpit. A landing gear 5 is arranged in the area of the gondola 2 in front of the aerodynamic center of wind pressure $S_A$ of the airship 1. The landing gear 5 is connected to the supporting frame on the one hand and to the airship gondola 2 on the other hand. An additional landing gear 6 is embodied as a single wheel and is arranged on the floor of the airship in the area behind the aerodynamic center of wind pressure $S_A$. Depending on the type of the tail unit 9 or stabilizer fin assembly of the airship, it is possible to arrange this landing gear 6, for example on a downwardly extending vertical stabilizer fin. The tail unit 9 includes rudders 9A and elevators 9B as shown in FIG. 1. In addition to the steering achieved by the aerodynamically effective stabilizer assembly fins 9 with their rudders, the propulsion plants 7, 8 can be utilized not only for providing forward drive, but also for steering. For this purpose, the lateral engines 7 and the tail engine 8 are embodied as swivelable or tiltable engines or are equipped with swivelable or tiltable propellers.

Figure 2:
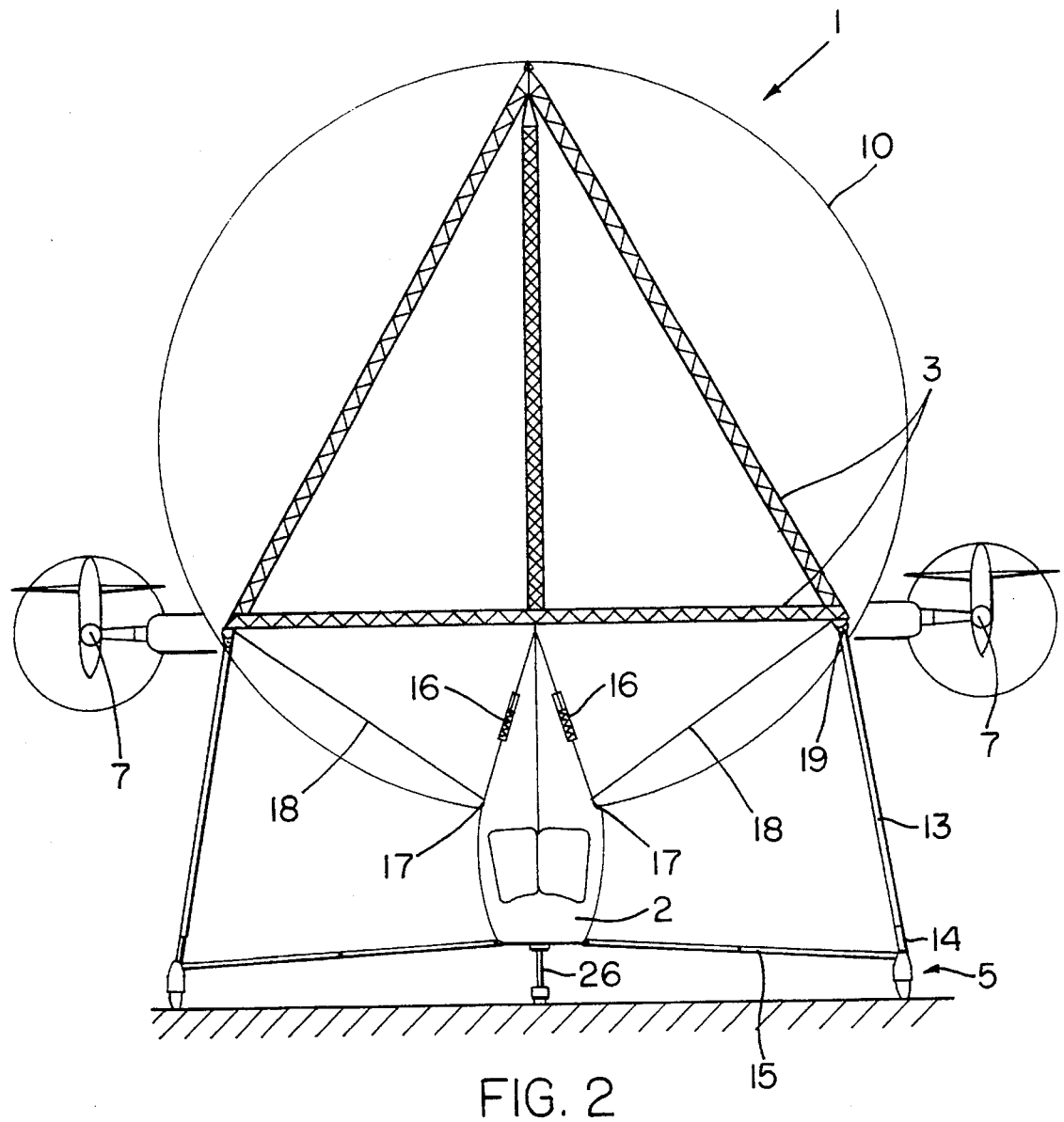
FIG. 2 is a cross-section through the airship of FIG. 1 in the plane of the landing gear.

In FIG. 2 the airship 1 is shown in cross-section in the plane of the landing gear. The cross-ribs 3 are once again shown, as well as the outer skin or envelope 10 of the airship 1 which is connected to the supporting frame at the junction node points between the cross-ribs 3 and the longitudinal beams which are not shown. The tiltable engines 7, 8 are secured to the supporting frame in a generally known and therefore not described manner. The engines 7, 8 serve for providing forward thrust as well as for steering. At the illustrated cross-sectional plane in which the landing gear lies, the gondola 2 is provided with a transverse bulkhead for taking up the arising loads. The loads are transmitted by the transverse bulkhead to the gondola suspension points 17, which lie in the same cross-sectional plane. In this plane, the gondola 2 is connected by guy wires 18 to the lower junction node points of the cross-ribs 3 with the not visible longitudinal beams 4 and to the junction node points of the next cross-rib or bulkhead plane. In order to stabilize the gondola 2, additional pretensioned gas pressure springs 16 or rigid carrying members with an overload safety mechanism are installed and connected to the cross-rib 3. Moreover, pivot points 19 are secured to the above mentioned node points outside of the airship envelope 10, whereby in turn shock absorber members 14 guided in shock absorber struts 13 are connected to the pivot points 19. The shock absorber member 14 comprises a prestressed gas pressure spring and an oil hydraulic shock absorber. The direction of force application of the shock absorber strut 13 thereby intersects the center of the junction node point of the horizontal and the diagonal cross-rib. Respective landing gear lateral rocker arms 15 are articulately connected to the gondola floor and meet the shock absorber member 14 at the landing gear 5.

Figure 3:
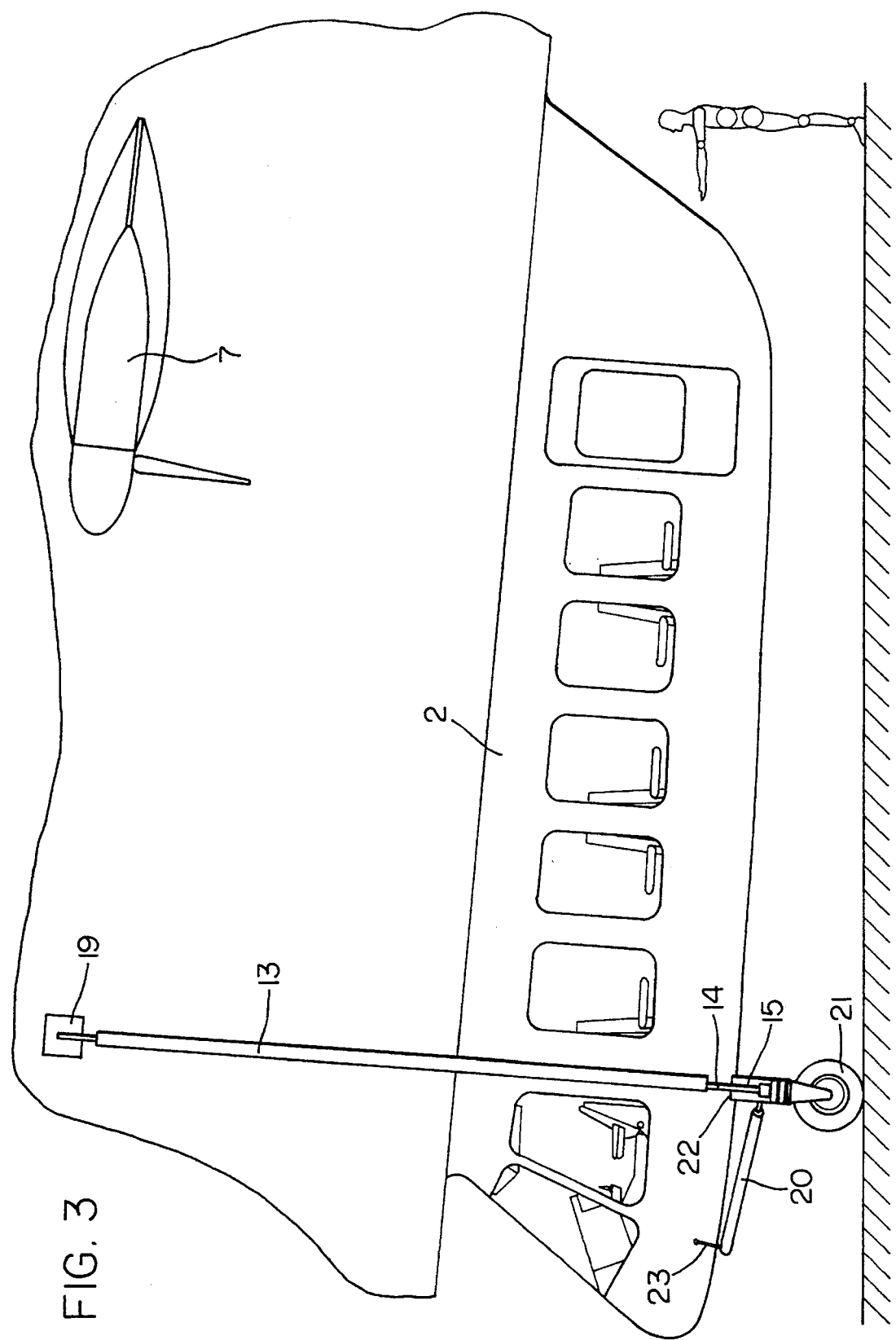
FIG. 3 is an enlarged view of FIG. 1 in the area of the airship gondola.

This landing gear arrangement is also shown in FIG. 3 in an enlarged side view with a landing gear wheel 21. Additionally, the respective articulate connection of a bracing strut 20 with the airship gondola 2 on the one hand and the landing gear lateral rocker arm 15 on the other hand is also visible in FIG. 3.

Figure 4:
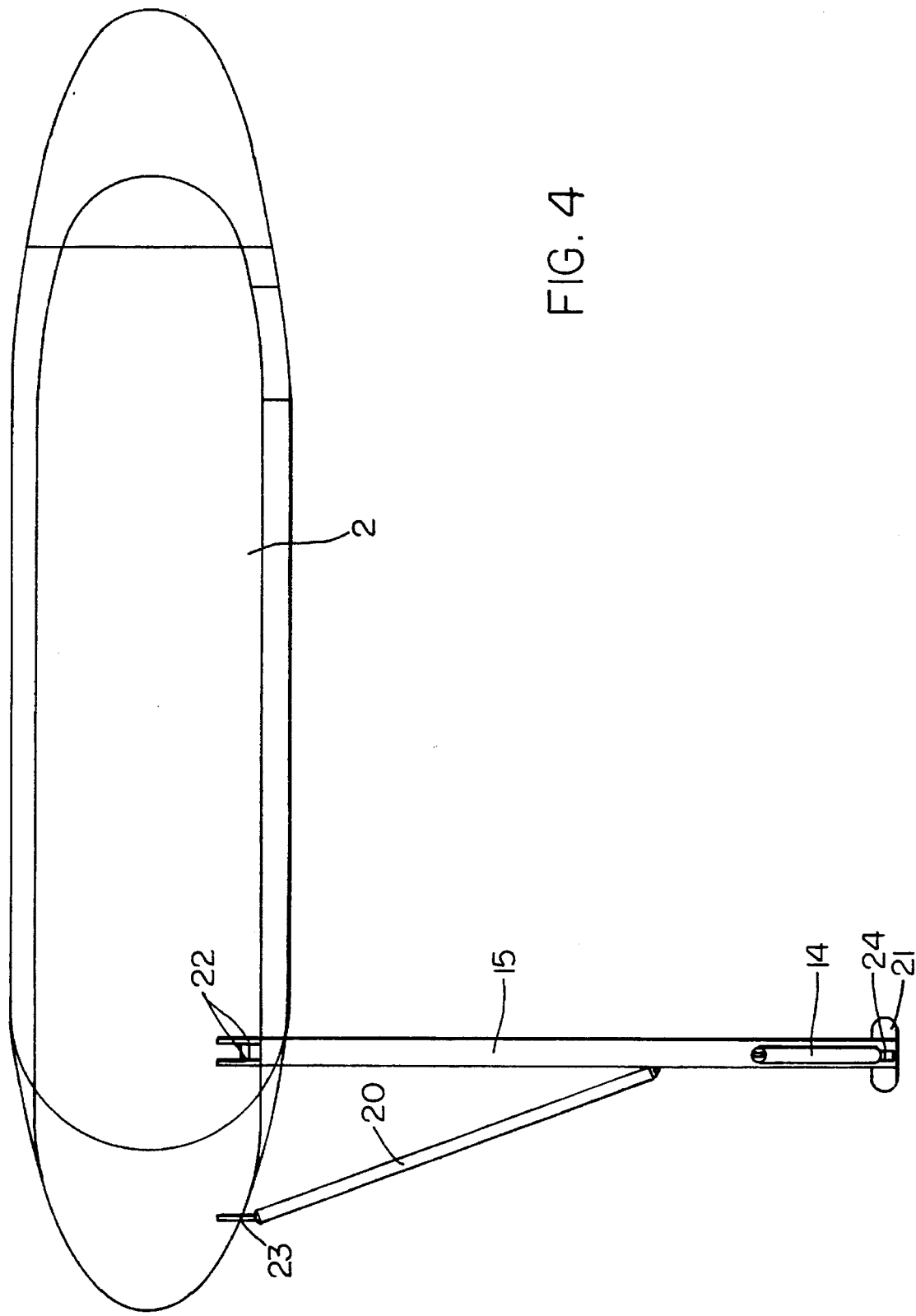
FIG. 4 is a top view onto the landing gear on one side of the airship.

FIG. 4 shows this arrangement in a top view in which the pivot attachment points 22 or 23 of the landing gear lateral rocker arm 15 or the bracing strut 20 to the gondola 2 are more clearly visible. In order to reduce the aerodynamic resistance, the landing gear lateral rocker arm 15, the bracing strut 20, and the shock absorber strut 13 can be profiled in an aerodynamically advantageous manner, for example, in the form of a lifting wing with a wide wing end with two hinge points 22 and a narrow wing end for connecting to a wheel bearing body 24. In order to reduce the weight, these profiles can be constructed of carbon fiber reinforced composite material, aluminum, or the like.

Figure 5:
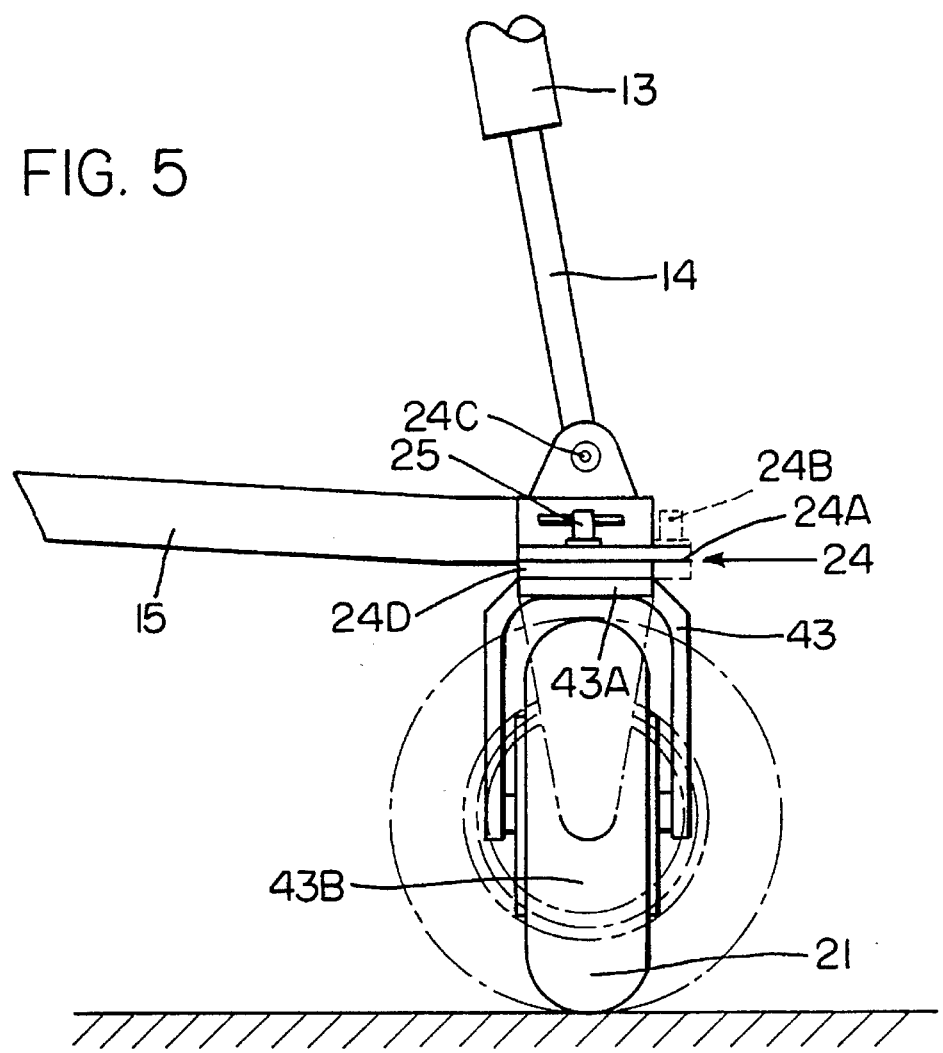
FIG. 5 is a front view of a landing gear part.
Figure 6:
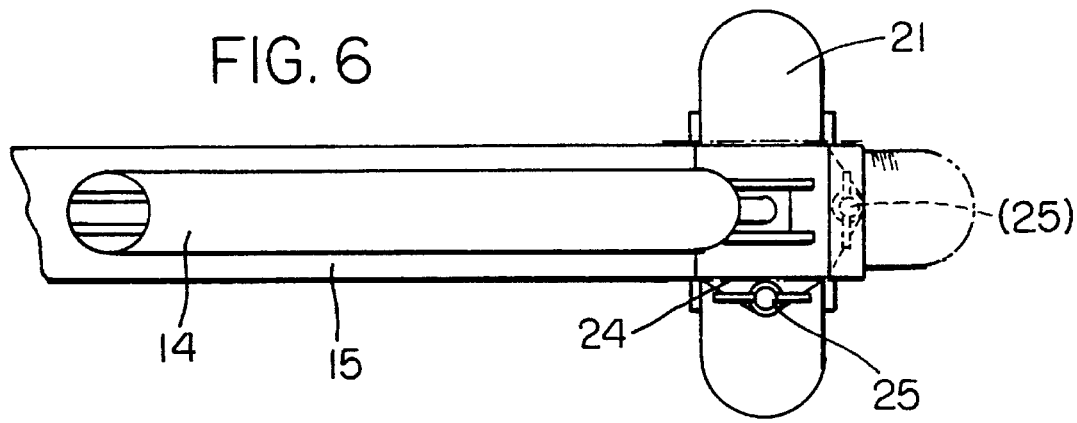
FIG. 6 is a top view of the landing gear part of FIG. 5.

This wheel bearing body 24 is shown in an enlarged view of the landing gear in a front view in FIG. 5 and in a top view in FIG. 6. As is clearly visible, an upper part 24A of the wheel bearing body 24 is rigidly connected to the landing gear lateral rocker arm 15 by bolts 24B while the shock absorber member 14 is articulately connected with the upper part 24A of the wheel bearing body 24, for example, by a bolt connection 24C inserted in an eye of the piston rod of the shock absorber member 14. A lower part 24D of the wheel bearing body 24 is connected to a top portion 43A of a fork 43 whereby the wheel bearing body 24 is rigidly connected with the landing gear lateral rocker arm 15 and pivotally connected with the shock absorber member 14. However, the upper part 24A and the wheel fork 43 holds the landing gear wheel 21. The upper and lower part 24D of the wheel bearing body 24 are preferably so embodied that the wheel fork 43 with the wheel 21 is rotatable about a vertical axis 43B through the bearing body 24. This can, for example, be achieved by removing and repositioning a bolt 25, whereby the wheel 21 is again locked in a position rotated by 90°. However, this rotation could be carried out from the cockpit by means of suitable mechanisms that are not described in detail, whereby it would become possible to steer the airship on the ground. This is especially practical if a vertical landing of the airship 1 is no longer possible, for example, due to a high operating load or due to the loss of lifting gas, so that the airship 1 must carry out an aerodynamic landing on its landing gear such as is carried out by other aircraft.

Figure 14:
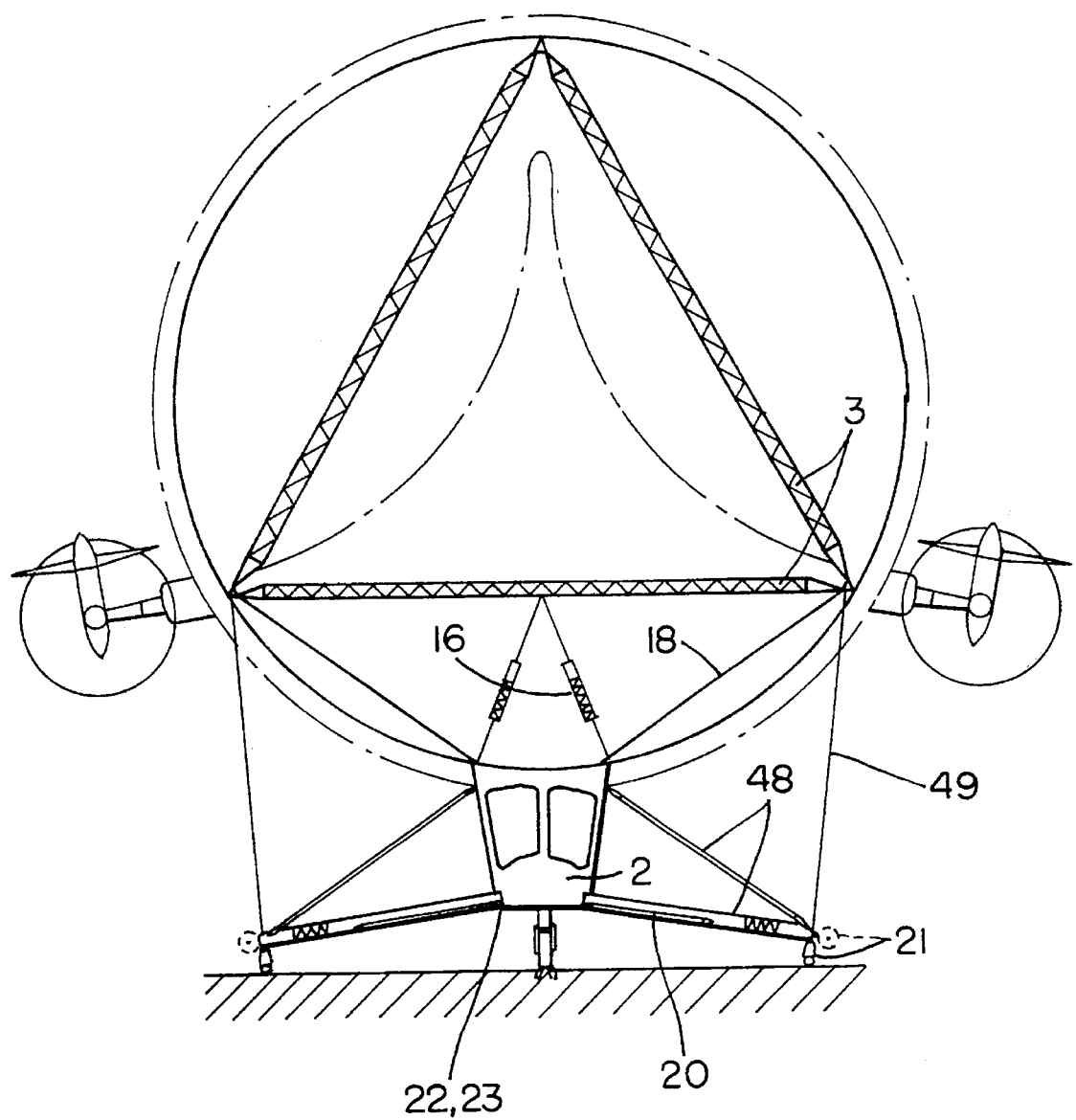
FIG. 14 shows another embodiment of the landing gear with a truss frame and cable bracing.

An alternative to this landing gear arrangement is shown in FIG. 14. In this case, the shock absorber members 14 with the shock absorber struts 13 and the landing gear lateral rocker arms 15 are omitted. Instead, the landing gear is connected to the gondola 2 as a truss frame 48 made of individual beams or as an interconnected truss assembly. The force transmission to the cross-rib 3 is carried out by tension cables 49 instead of the shock absorber member 14 and the shock absorber strut 13.

In the embodiment of FIG. 14 it is particularly easily possible, when necessary, to arrange the landing gear in such a manner that it may be folded sideways to lie up against the side of the airship or the gondola body after the attachment points and the bracing strut have appropriately been disengaged.

Independently of the above described two different embodiments of the bi-pod landing gear, the wheel base or track width of the landing gear is preferably within the range of 0.7 to 1.2 times the maximum airship diameter in order to achieve a sufficient lateral bracing or support of the airship.

Furthermore, it is possible to keep the entire preassembled landing gear in a constant state of readiness on the ground and only attach it to the airship by means of the above described attachment points for the purpose of anchoring the airship. In this manner the weight of the landing gear can be saved and a correspondingly larger usable load can be transported.

Figure 7:
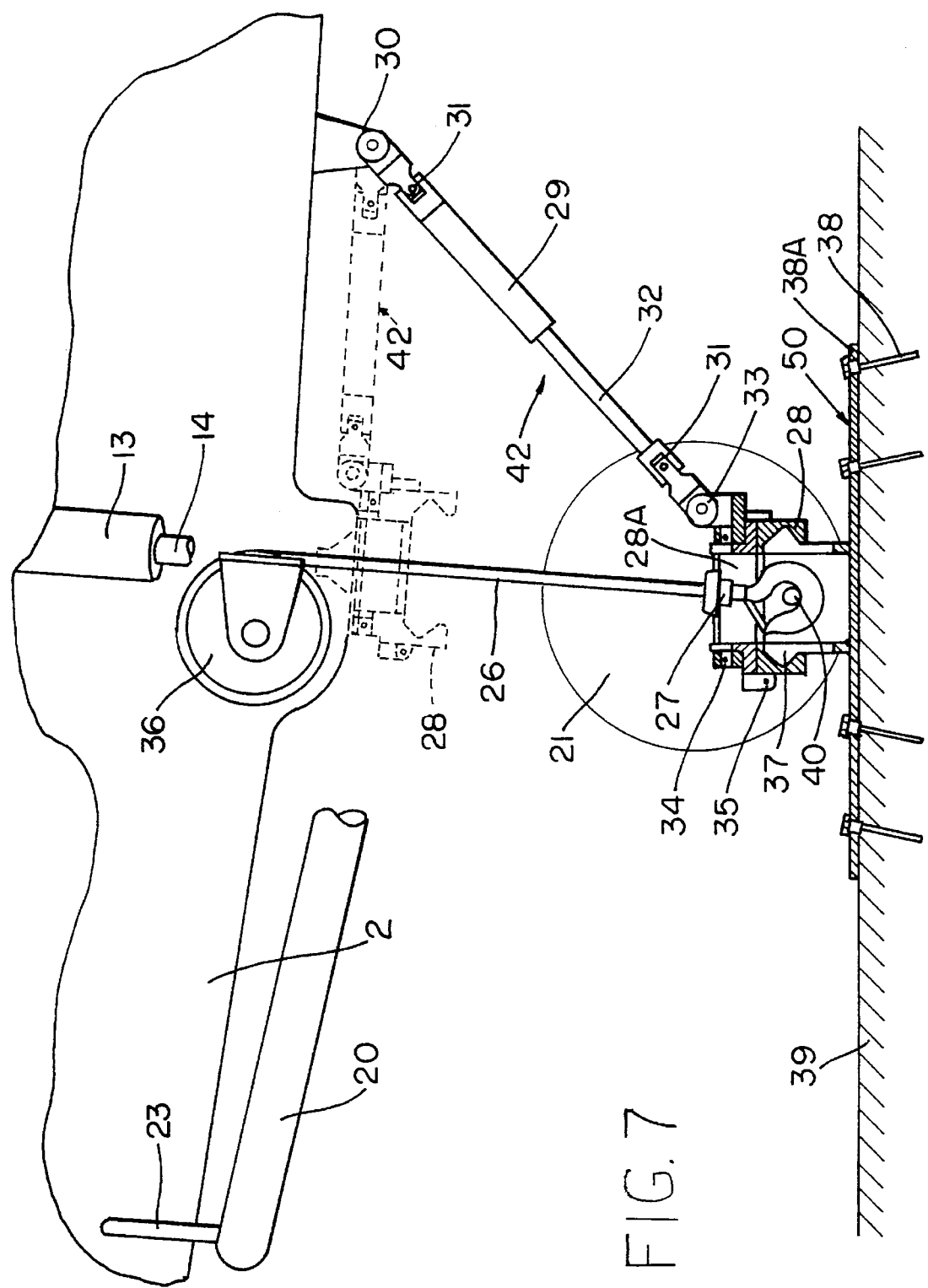
FIG. 7 shows the landing and anchoring mechanism according to the invention with a ground based holding mechanism and a connecting rod.

The additional mooring or anchoring arrangement that is provided to supplement the bi-pod landing gear according to the invention for connecting the airship to an anchoring or mooring station will now be described in further detail with reference to FIG. 7. Equivalent reference numbers in this figure and in the following figures indicate the same components so that repetition of items can be avoided that have already been described above. According to FIG. 7 the additional mooring arrangement comprises three components, namely a holding or mooring mechanism 50 provided on the ground, a retractable holding or mooring cable 26 1, and a clamping device 28 carried by the airship 1. The provided on the airship and the clamping device 28 are airship based holding cable 26 connectable with the ground based holding mechanism 50 as will now be described.

The ground based holding mechanism 50 is constructed, for example, of aluminum or steel, as a mooring or anchor plate 38A which is secured by heavy load dowels and screws 38 to a concrete slab 39 or directly to the landing field. An anchor or mooring 37 is welded onto the anchor plate. The clamping device 28 can be set onto and connected with the anchor or mooring 37 when the airship 2 has landed.

In this example embodiment the clamping device 28 has a bottom part that can be folded open in the manner of a pipe coupling in order to be pushed over the conical part of the anchor or mooring 37. Then, the clamping device 28 can be folded closed and locked by means of the eye bolt 35 and quick clamping levers. The upper part of the clamping device 28 is rotatably connected with an axial bearing 34. A length adjustable connecting rod 42 is secured to this upper part of the clamping device 28 by a pivot joint 33. The other end of the connecting rod 42 is articulately connected to the floor of the gondola 2 at the bearing point 30. An end stop of the connecting rod 42 can be provided with a shock absorber. This connecting rod 42 with the pivot joint 33 is arranged in the center plane of the gondola floor displaced rearwardly relative to the landing gear plane, so that the anchoring head 37 with the clamping device 28 attached to the connecting rod 42 can be moved downwardly away from the gondola floor by tilting or folding down the connecting rod 42. This movement is controlled from the cockpit or from the ground.

The holding or mooring cable 26 is stored on a drum of a winch 36 in the gondola 2. The winch 36 may, for example, be electrically or hydraulically driven. A hook 27 is attached to the end of the holding cable 26. This holding cable 26 emerges downwardly out of the gondola floor in the landing gear plane, and in fact through a hollow part 28A of the clamping device 28. The anchor 37 is also hollow, as seen in FIG. 7, to accommodate the hook 27. A cross-pin 40 for holding the hook 27 of the holding cable 26 is provided in the mooring 37 connected to the ground plate 38A. In order to hook the hook 27 into the cross-pin 40 in the mooring 37, the mooring 37 comprises the hollow part 28A as a slot or slit through which the hook 27 can be guided for engaging the cross-pin 40 as shown in FIG. 7.

Figure 12:
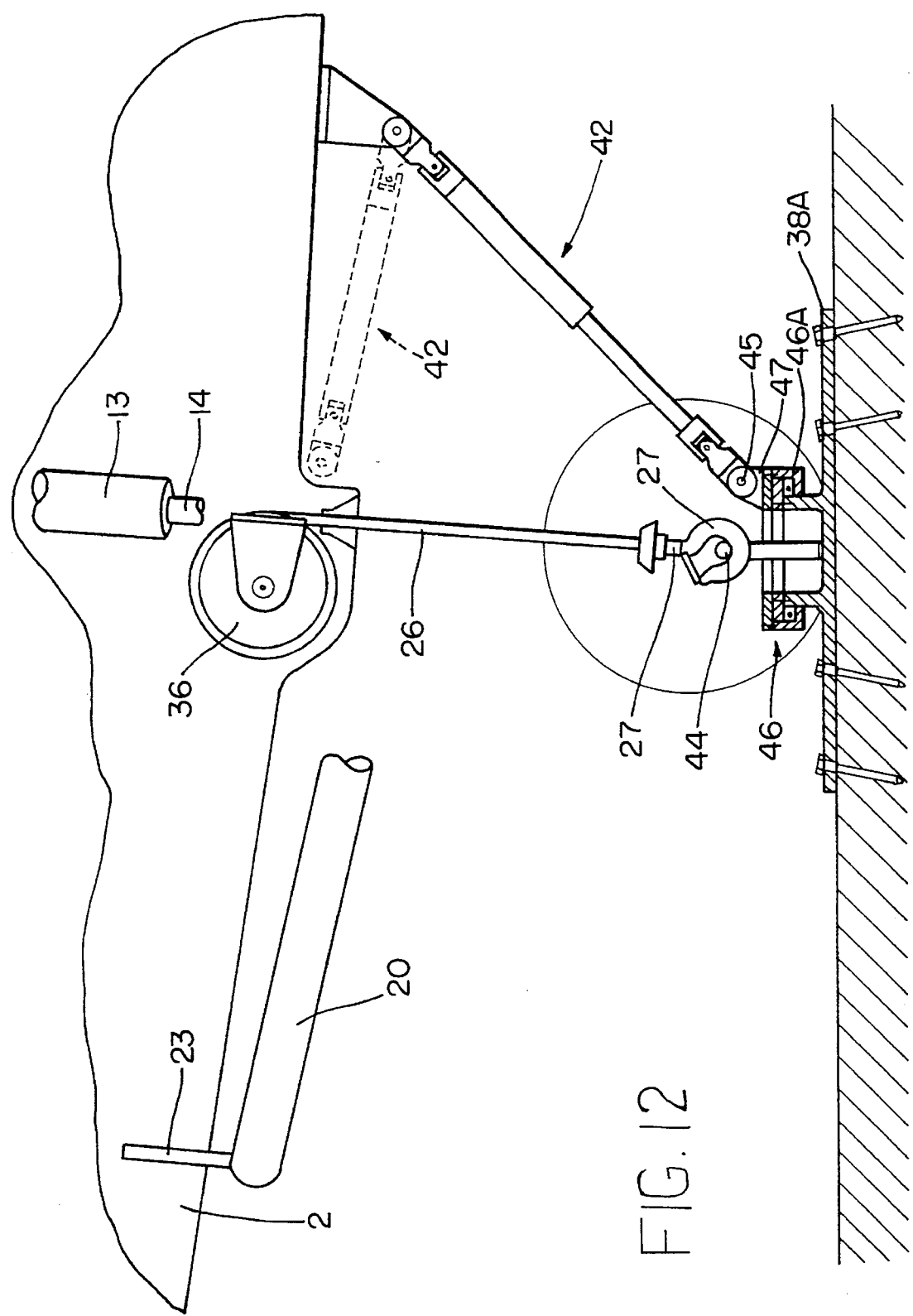
FIG. 12 shows an embodiment of the landing and anchoring mechanism according to the invention with a winch for the mooring cable on the ground.

Another possibility to secure to hook 27 on the ground is to use an eye 44 according to FIG. 12. In that embodiment the hooking point of the hook 27 in the eye 44 lies above the anchoring head 46 and is thereby freely accessible. In order to make it possible to drive over the ground based holding mechanism, for example during maneuvering operations on the ground, the embodiment having the cross-pin 40 inside the mooring 37 is preferred. Additionally, for this purpose, the mooring 37 can comprise angled surfaces such as, for example ramps, on its circumferential sides, which allow the wheels 21 to roll over the mooring 37 without damage.

Figure 8:
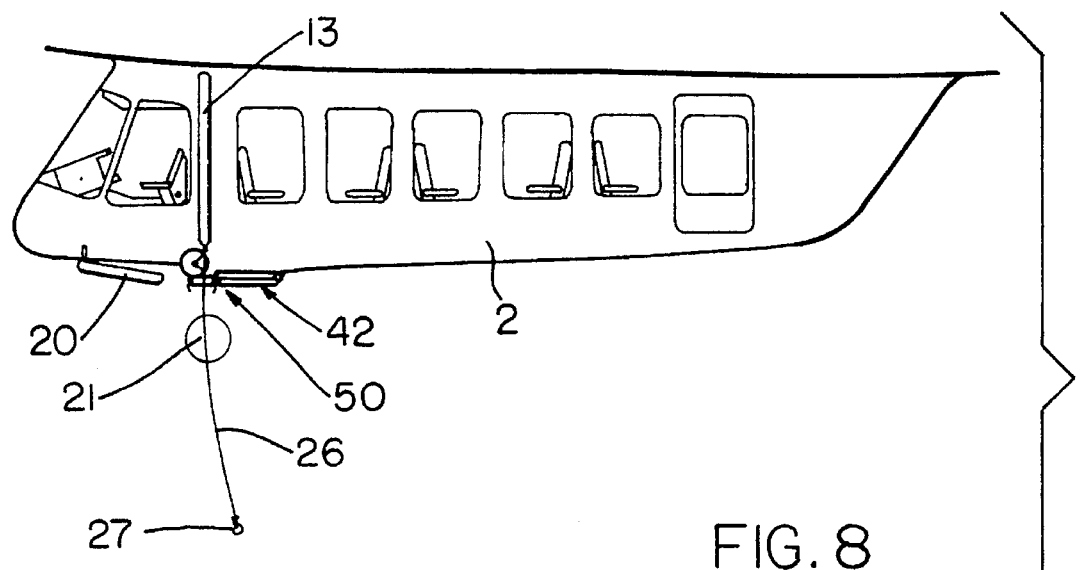
FIGS. 8 to 10 show the gondola section of an airship with the landing and anchoring mechanism according to the invention in three different landing phases.
Figure 9:
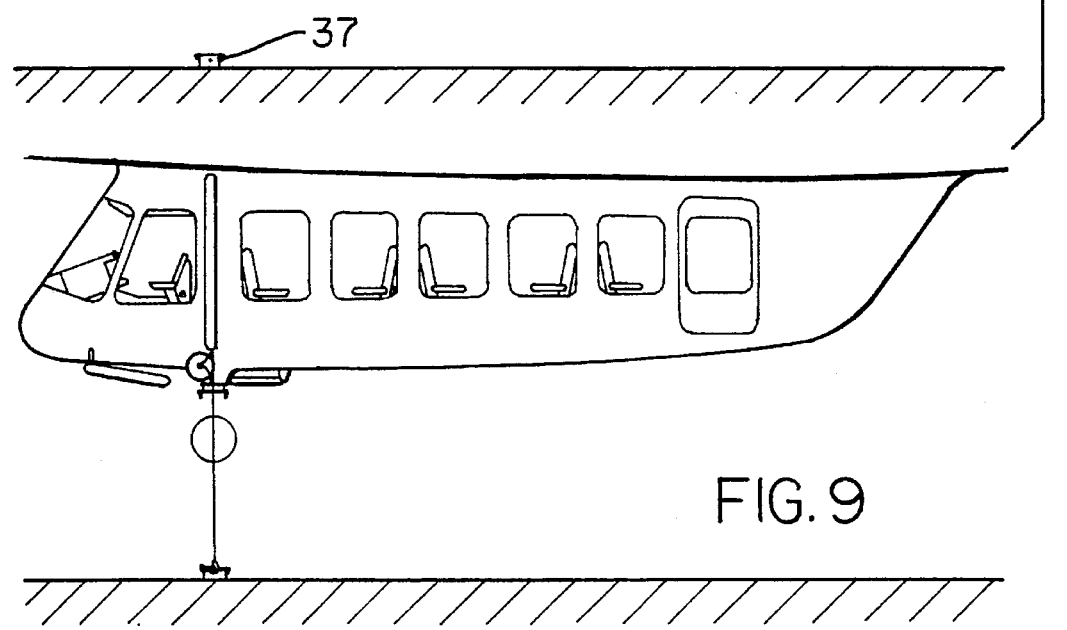
Figure 10:
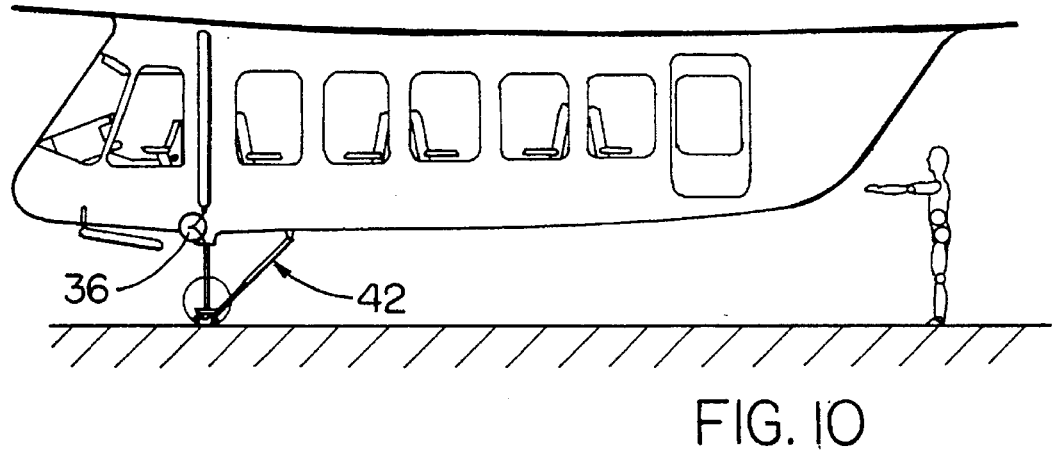

In connection with FIG. 7 and with reference to the following FIGS. 8 to 10, the landing and anchoring procedure will now be described.

The airship 1 is guided toward the ground based holding mechanism in a hovering or floating condition, by the aerodynamically effective stabilizers 9B and rudder 9A of the tail unit 9 and the pivotable engines 7 and 8. Then the holding cable 26 and therewith the hook 27 is lowered from the gondola floor by means of the winch 36 and then ground personnel latch the hook 27 into the cross-pin 40 which can be arranged recessed in the ground or in the mooring 37.

The holding cable 26 is then reeled in by the winch 36 located on board, and the airship 1 is securely pulled to the ground against the thrust of the propellers until the two wheels 21 of the forward landing gear and the wheel of the rear landing gear rest on the ground. The pulling force of the winch 36 shall be greater than the maximum lifting or buoyant force of the airship 1 minus the weight of the airship or minus half of the upward directed thrust force of the pivotable engines 7, 8. The holding strength of the winch 36 and the cable 26 must be larger by a factor of 1.5 than the greatest arising tension force.

The securing of the airship 1 on the ground can now be completed by an additional rigid connecting rod 42 whereby the airship is anchored against higher wind velocities. This is achieved in that the connecting rod 42 is tilted or folded down from the gondola floor until the clamping device 28 can be pushed over the anchor or mooring 37 and be connected and secured thereto in the above described manner. The connecting rod 42 takes up the longitudinal and crosswise forces arising on the airship 1 and transmits them into the ground, while the holding cable 26 prevents a lifting off of the airship. Two universal joints 31 in the connecting rod 42 prevent undefined force transmissions.

In this manner, a rigid connection of the airship 1 to the ground is accomplished and the two landing gear wheels 21, which provide support or bracing at far outward lying points, form a commonly rotating platform or turntable with the cross-pin 40 as a fixed center point.

The airship 1 which is exposed to the wind, rotates about this center point depending on the wind direction (W1, W2) whereby the two landing gears 5 support the airship 1 against rolling about its longitudinal axis (X-axis). The anchoring between the cross-pin 40 and a fixed point on the gondola floor thereby prevents a lifting off of the unloaded landing gear leg.

Figure 11:
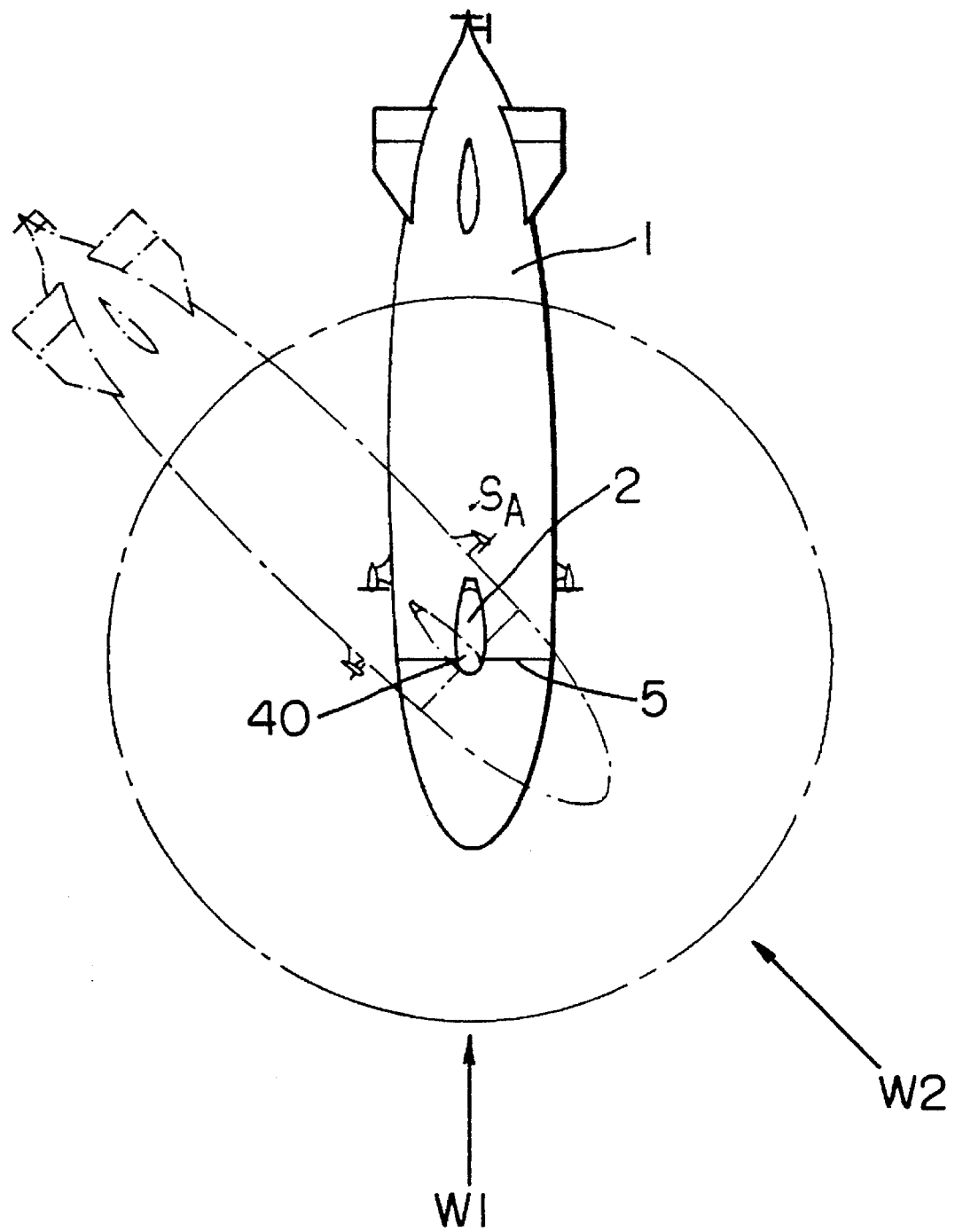
FIG. 11 is a top view of an airship with a schematically illustrated rotation into the wind.

Thereby, the tail landing gear 6 moves in a circle about this center point, as is shown in FIG. 11. In order to secure the tail of the airship against lifting off, ballast in the form of sand bags or the like can additionally be hanged in place.

Other possible measures against lifting off of the tail of the airship are the active adjustment of the elevator fin 9B by an electronically controlled fin control system. Using a so-called mast function of the control, the wind direction can be automatically monitored and corresponding fin control motions can automatically be triggered which push the tail of the airship downward.

An alternative of the attachment with the connecting rod is seen in FIG. 12, wherein, a rotatable anchoring head 46 is secured to the anchor plate 38A by an axial bearing 46A. The hook 27 of the anchoring cable 25 is hooked into the eye 44 and the connecting rod 42 is securely attached to a bearing point 47 by a journal pin 45 after the landing has been completed. An advantage of this embodiment is that the weight of the anchoring head 46 does not have to be carried along during the flight.

Figure 13:
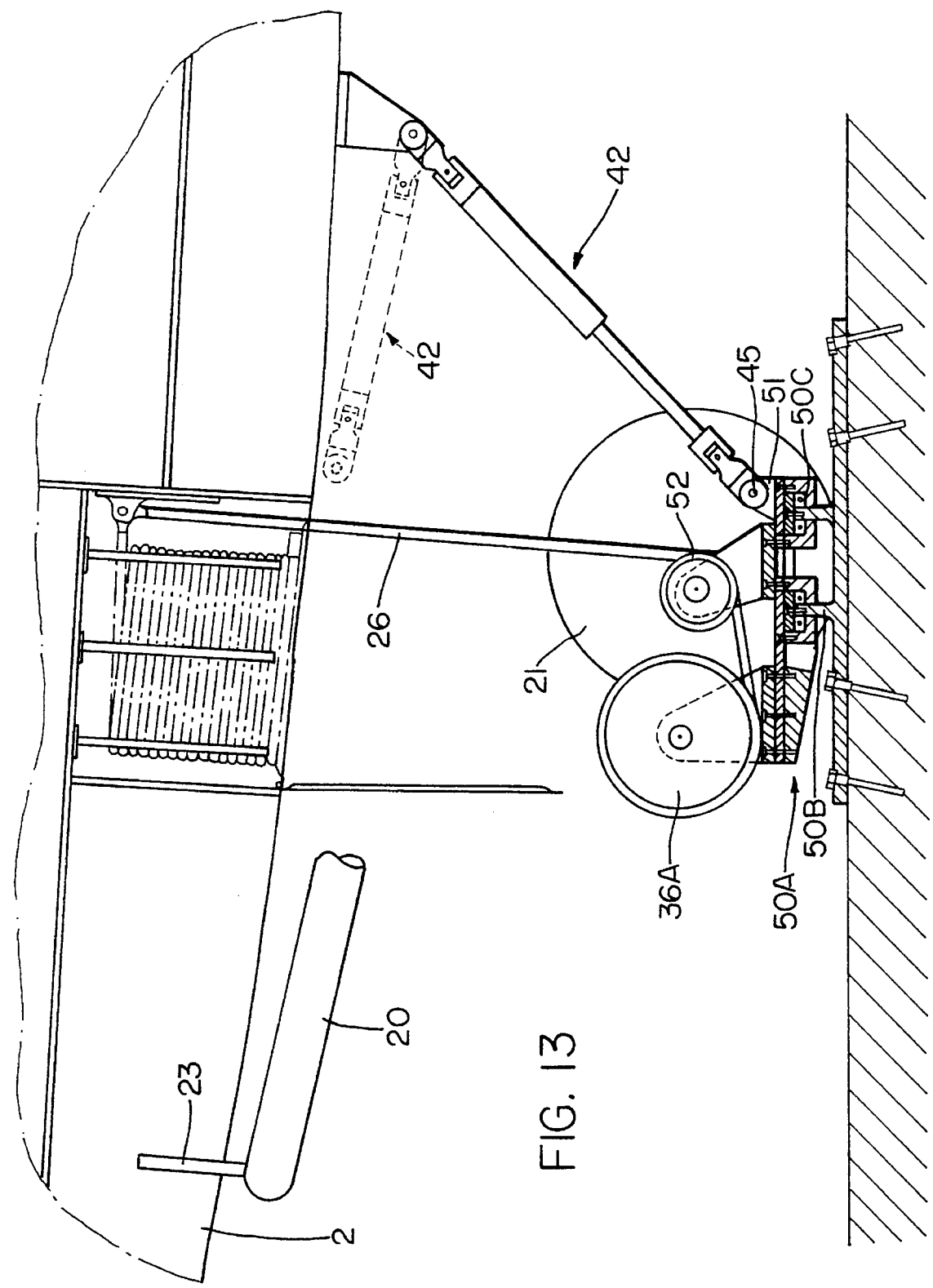
FIG. 13 shows a further embodiment of the landing and anchoring mechanism according to the invention, with a winch for the mooring cable on the ground.

FIG. 13 shows a further alternative embodiment intended to be used for smaller airships having a limited lifting capacity. In this case, a winch 36A is located in the ground based equipment. According to FIG. 13, similarly a rotatable anchoring head 50A is connected to an anchor or mooring 50B by an axial bearing 50C. A bearing point 51 for attaching the connecting rod 42 is provided on the rotatable anchoring head 50A in a manner identical to that described above.

In FIG. 13 the cross-pin 40 and the eye 44 described above, have been replaced by a cable reel 52 and a winch 36A so positioned that the cable 26 can be guided by the cable reel 52 onto the drum of the winch 36A. In this manner the flight weight of the airship 1 is still further reduced and the transportable useful load is further increasable.

For this example embodiment, the landing and anchoring process will now be described.

The holding or mooring cable 26 is thrown down through the gondola floor, after opening a floor hatch. A member of the ground crew connects the holding cable 26 with a laid out cable of the winch 36A which pulls the airship 1 to the ground. Now the connecting rod 42 is tilted down and connected to the anchoring head 50A by the bolt 45. If the airship 1 is now turned by the wind, then the winch 36A turns along with the airship.

In all of the described example embodiments, the forces arising in the landing gear legs and from the anchor point on the gondola floor are directly transmitted into the triangular shaped bulkhead of the supporting frame structure lying above the gondola, and from there are transmitted further into the entire structure.

Through aerodynamic calculations it has been verified that the loading due to a jolt or shock of landing on the front landing gear legs is of similar magnitude as the load arising in mooring or anchoring at a wind velocity up to about 7 on the Beaufort scale.

The anchoring eye or pin on the ground must be properly adapted to the arising forces. The presence of such an anchoring eye must be taken into account for flight planning.

In connection with the technical possibilities of an airship according to the German Patent Publication No. DE-PS 4,018,749, corresponding to U.S. Pat. No. 5,110,070 (Hagenlocher et al.) the described landing and anchoring mechanism offers the advantage of great simplicity. The ground personnel is reduced to two or three persons. Anchoring masts or mooring masts are only necessary at places where a long term mooring is to take place. Due to the already provided supporting structure, the additional weight necessary for the forward bi-pod landing gear is small.

When the airship 1 is to be anchored or moored on a mast for long duration mooring or when stormy weather is forecast, the front wheels 21 are released or disengaged and rotated by 90° about a vertical axis. The airship 1 is slightly lifted on the mast, so that only the tail landing gear 6 rests on the ground. The wheels 21 of the forward landing gear 5 now serve as rolling support or stabilizing brace.

Although the invention has been described with reference to specific example embodiments, it will be appreciated that it is intended to cover all modifications and equivalents within the scope of the appended claims.

I claim:

1. An airship construction comprising a supporting frame including sets of cross-ribs (3) and longitudinal beams (4) interconnecting said sets of cross-ribs at respective nodes, each of said sets of cross-ribs defining a cross-plane perpendicularly to a longitudinal axis of said airship, a gondola (2) secured to said supporting frame, a bi-pod landing gear (5) including at least two landing wheels (21) and an anchoring device (26, 27), a wheel mounting for each of said landing wheels (21), each wheel mounting comprising a triangular truss frame, both truss frames being positioned in one cross-plane of said cross-planes, said one cross-plane being positioned forward of an aerodynamic center of wind pressure (5A) of said airship construction (1), each truss frame comprising a portion of said airship construction forming a first triangle side and two connecting elements (13, 15; or 48) forming second and third triangle sides interconnected to form an outer triangle corner opposite said one triangle side, each of said at least two wheels being connected to a respective outer triangle corner, said two connector elements (13, 15; 48) being pivoted to ends of said first triangle side so that a triangle plane of each triangular truss frame coincides with said one cross-plane, and an anchor mounting securing said anchoring device (26, 27) to a floor of said gondola (2) in an area of said one cross-plane.

2. The airship construction of claim 1, wherein said bi-pod landing gear (5, 5') has a wheel base track selected within the range of 0.7 to 1.2 times the maximum airship diameter.

3. The airship construction of claim 1, wherein one of said two connecting elements of each triangular truss for each landing gear (5) is a shock absorber strut (13) articulately connected to a junction node between a cross-rib (3) and a longitudinal beam (4) in said one cross-plane.

4. The airship construction of claim 1, further comprising a tension cable (49) for each triangular truss frame connected to said outer triangle corner and to said supporting frame at a junction node of a cross-rib (3) and a longitudinal beam (4) in said one cross-plane (FIG. 14).

5. The airship construction of claim 1, wherein said triangular truss frames of said landing gear (5) are foldable sideways about pivotable attachment points (22).

6. The airship construction of claim 1, further comprising a bracing link (20) respectively for each truss frame, releasably connected at one link end to said airship gondola (2) and to a landing gear lateral rocker arm (15) forming one of said two connecting elements for each landing gear.

7. The airship construction of claim 1, wherein said two connecting elements comprise a shock absorber strut (13, 14) and a landing gear lateral rocker arm (15) both of which are shaped to have an aerodynamically advantageous profile.

8. The airship construction of claim 7, wherein said landing gear lateral rocker arm (15) is rigidly connected to a bearing body (24) of a wheel fork (43) holding a respective wheel (21) of the landing gear (5), and wherein said shock absorber strut (13) is articulately connected to said bearing body (24).

9. The airship construction of claim 8, wherein said wheel fork (43) with the wheels (21) is rotatably arranged in said bearing body (24).

10. The airship construction of claim 1, wherein said anchoring device comprises a retractable holding cable (26) with a connector (27) on-board said airship construction (1) and a holding mechanism (37, 40) provided on the ground for connecting said cable (26) to said holding mechanism (37, 40).

11. The airship construction of claim 10, wherein said anchoring device further comprises a winch (36, 36A) that reels in and reels out said holding cable (26).

12. The airship construction of claim 10, wherein said holding mechanism on the ground comprises a securing device (28) for rotatably and releasably connecting said cable (26, 27) to said holding mechanism (37, 40) on the ground.

13. The airship construction of claim 12, wherein said securing device (28) is a clamping device (28) that is adapted to be clamped to an anchor (37) of said holding mechanism (37, 40).

14. The airship construction of claim 11, wherein said winch (36) is arranged on board.

15. The airship construction of 11, wherein said winch (36A) is arranged on the ground.

16. The airship construction of claim 10, further comprising an additional connecting rod (42) connectable between a floor of said gondola and said holding mechanism (37, 40).

17. The airship construction of claim 16, wherein one end of said additional connecting rod (42) is articulately connected to said airship construction (1) and the other end of said additional connecting rod (42) is operatively connected to said holding mechanism (37, 40).

18. The airship construction of claim 16, wherein said additional connecting rod (42) is adjustable in its length.

19. The airship construction of claim 17, wherein a securing point (30) of said additional connecting rod (42) to a floor of said gondola (4) is so selected that the connecting rod (42) deviates from the vertical by at least 15° when said airship construction (1) is in an anchored condition.

20. The airship construction of claim 16, wherein said holding mechanism (37, 40) comprises a pin (40) or an eye (44) for securing an end of a cable (26) on the ground, and a journal (33) for securing a lower end of said connecting rod (42) on the ground.

21. The airship construction of claim 1, wherein said landing gear is preassembled and is connectable as a complete unit with said airship construction (1).

22. The airship construction of claim 1, further comprising an additional tail landing gear (6).

23. The airship construction of claim 1, wherein said anchoring device comprises an anchoring cable (26) positioned, when displayed, in said one cross plane.

* * * * *